United States Patent [19]

Dalbera

[11] Patent Number: 4,858,855
[45] Date of Patent: Aug. 22, 1989

[54] AUTONOMOUS ONBOARD LOADING DEVICE FOR A CARGO-AIRCRAFT

[75] Inventor: Jacques M. Dalbera, Colomiers, France

[73] Assignee: Aerospatiale Societe Nationale Industrielle, Paris, France

[21] Appl. No.: 198,134

[22] Filed: May 24, 1988

[30] Foreign Application Priority Data

Jun. 4, 1987 [FR] France .................................. 87 07801

[51] Int. Cl.⁴ ........................... B64C 1/22; B64D 9/00
[52] U.S. Cl. .................................. 244/137.1; 414/542; 212/209
[58] Field of Search ........................... 244/118.1, 137.1; 212/209, 218, 219; 414/540, 541, 542, 921

[56] References Cited

U.S. PATENT DOCUMENTS

| | | | |
|---|---|---|---|
| 3,051,419 | 8/1962 | Weiland et al. | 414/542 |
| 3,463,334 | 8/1969 | Blakely et al. | 244/137.1 |
| 3,552,587 | 1/1971 | Warren | 244/137.1 |
| 3,561,704 | 2/1971 | Schulze | 244/137.1 |
| 3,776,492 | 12/1973 | Iben | 244/137.1 |
| 3,952,974 | 4/1976 | Lang | 244/137.1 |
| 4,586,684 | 5/1986 | Carter et al. | 244/137.1 |

Primary Examiner—Joseph F. Peters, Jr.
Assistant Examiner—Rodney Corl
Attorney, Agent, or Firm—Martin Smolowitz

[57] ABSTRACT

The autonomous onboard device for loading a cargo-aircraft having a lateral door comprises hoisting means (10) movable between the exterior and the interior of the fuselage (F) of the aircraft along carrier and guide means (3,4,5), which comprise transverse rails (3) inside the fuselage at the level of the upper part of the lateral opening (1) and two arms (4) provided with rails (5) movable between an extended position, in which they are in the extension of the rails (3) outside the fuselage, and a retracted position in which they are withdrawn into the fuselage. This device is light weight and of small size.

22 Claims, 6 Drawing Sheets

AUTONOMOUS ONBOARD LOADING DEVICE FOR A CARGO-AIRCRAFT

BACKGROUND OF INVENTION

The present invention relates to an autonomous onboard loading device for a cargo-aircraft having a lateral door, comprising hoisting means movable between the exterior and the interior of the fuselage of the aircraft, carrier and guide means for said hoisting means in the movement thereof between the interior and exterior of the fuselage, comprising a first part extending transversely inside the fuselage in the region of the lateral door and fixed in the upper part of the fuselage, and a second part movable between an extended position in which it is in the extension of the first part outside the fuselage and transversely projects from the fuselage through the upper part of the opening uncovered by the lateral door and a retracted position in which the second part is withdrawn within the fuselage, support means for the second part of the carrier and guide means in the extended position, means for actuating the hoisting means, means for shifting the hoisting means along the guide means, and means for extending and retracting the second part of the carrier and guide means.

A device of the aforementioned type is known from the U.S. Pat. No. 3,561,704. However, the carrier means are arranged through the lateral door itself, the guide means comprising only a single rail a part of which is directly fixed inside the door. Such a device requires a particular arrangement of the lateral door which must itself have a suitable structure for supporting the loads. Furthermore, this arrangement is difficult to associate with an opening of large size in that, in such a case, the strength required of the door would necessitate owing to its large size, massive structures which would be heavy and costly.

SUMMARY OF INVENTION

An object of the present invention is to overcome the aforementioned drawbacks by providing an autonomous onboard loading device for a cargo-aircraft having a lateral door which is light weight and does not require large structures as concerns both the device itself and the aircraft in which it is disposed.

The invention therefore provides a device of the aforementioned type, wherein the second part of the carrier and guide means comprises two arms each articulated at one of their ends inside the fuselage in the vicinity of a corresponding upper corner of said lateral opening of the fuselage, said arms extending in a direction parallel to each other in the extended position.

According to other features of the invention:

The support means comprise two stays each extending between a respective arm and the floor inside the fuselage, the stays being articulated at each of their ends to permit the retracting and extending of the arms.

The arms are articulated to pivot about an axis parallel to the axis of the fuselage.

Each arm comprises two longitudinal parts articulated to each other for assuming a position in the extension of each other in the extended position of the arm, these longitudinal parts being articulated to pivot an axis parallel to the axis of the fuselage.

The lower end of each stay is articulated to a respective trolley slidably mounted in a corresponding rail transversely fixed in the floor of the fuselage.

The means for extending and retracting the second part of the carrier and guide means comprise means for driving in translation trolleys supporting the stays in the associated rails.

The driving means comprise a motor disposed in the floor between the two rails and adapted to drive two winding elements each connected to a corresponding trolley through a cable.

According to a variant of the invention, the arms are each articulated to pivot about an axis which is inclined relative to the axis of the fuselage and the means for extending and retracting the second part of the carrier and guide means comprise two jacks each disposed in the fuselage between the upper wall of the latter and a respective arm.

At least one brace is provided between the arms.

The first part of the carrier and guide means comprises two first rails which are fixed parallel to each other on the upper wall of the fuselage and the second part of the carrier and guide means comprises two second rails each fixed under the corresponding arm, the relative position of the arms relative to the first rails being such that, in the extended position of the rails, the second rails assume a position in the extension of the first rails.

At least one of the first rails is withdrawable toward the axis of the fuselage.

The hoisting means comprise on each arm two tackles each carried by a respective trolley slidably mounted in the rails of the guide means, the trolleys carried by a given arm being interconnected as concerns movement in translation.

The control means of the hoisting means comprise for each arm a corresponding winch including at least one drum to which the tackles of the arm are connected through a respective cable, synchronization means being provided between the two winches of the control means.

Balancing means are provided which act on the synchronization means to modify the inclination of a load carried by the hoisting means with respect to the axis of the fuselage.

The shifting means of the hoisting means comprise, for each arm, a corresponding winch including a drum to which the trolleys of the arm are connected through a cable.

The shifting means associated with a given arm are controlled by the corresponding winch of the control means, releasable coupling means being provided for isolating the drum of the shifting means, this drum being associated with brake means.

The winches of the control means are each driven by a corresponding hydraulic motor associated with a respective brake device.

It must be understood that, in the definition of the invention, "loading device" is intended to mean a device which is capable of loading and unloading the cargo-aircraft with which it is associated, "hoisting means" is intended to mean means capable of raising and lowering a load, "onboard" is intended to mean the fact that the device is incorporated in the aircraft and is an integral part of the latter, "autonomous" is intended to mean that the device does not employ means exterior to the aircraft for performing its function.

BRIEF DESCRIPTION OF DRAWINGS

The following description with reference to the accompanying drawings which are given by way of nonlimitative examples, will explain how the invention can be carried out.

DESCRIPTION OF INVENTOR

Figure 1:
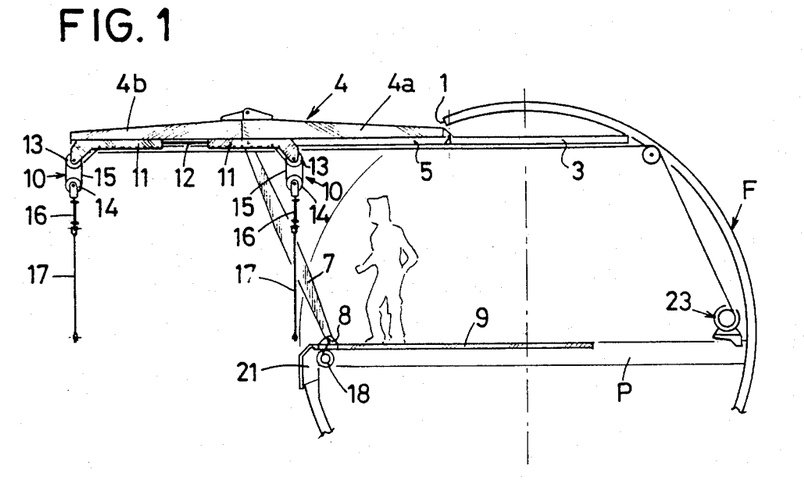
FIG. 1 is diagrammatic sectional view of a cargo-aircraft fuselage equipped with a loading device in the extended position for one embodiment of the invention.
Figure 2:
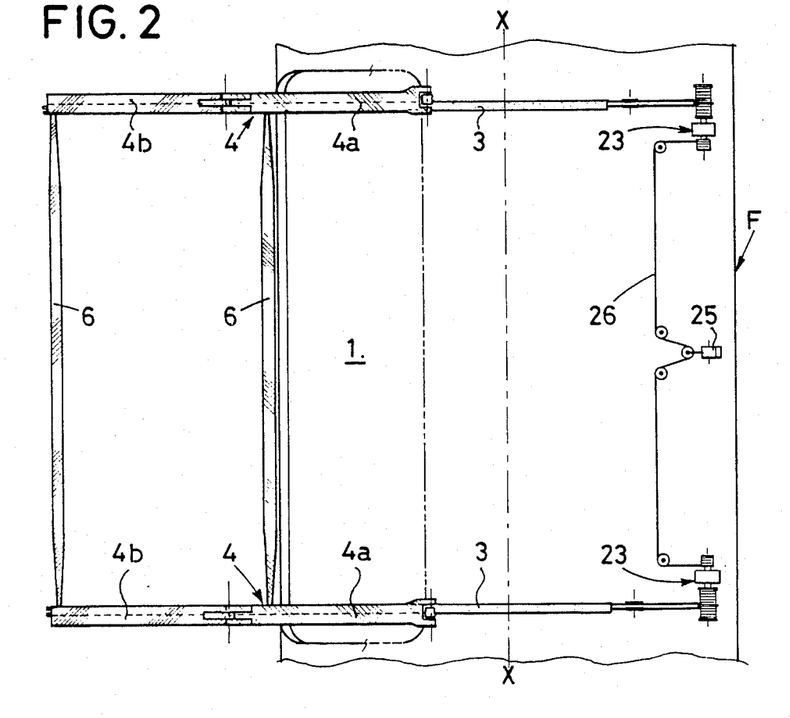
FIG. 2 is a diagrammatic top plan view of FIG. 1.
Figure 3:
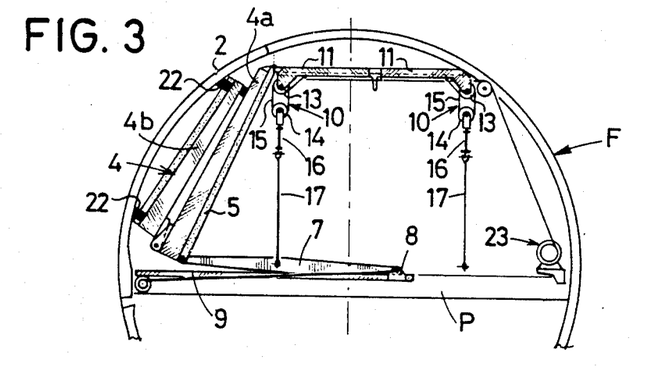
FIG. 3 is a view similar to FIG. 1 with the loading device withdrawn into the fuselage in the retracted position.

Reference will now be made to FIGS. 1 to 4 in which is illustrated a first embodiment of the loading device of the invention equipping a cargo-aircraft having a fuselage F having an axis X—X for loading or unloading loads, in particular vehicles and rolling equipment, pallets equipped with rolling means (military pallets) or not equipped with rolling means (civil pallets) or other means, through a lateral opening 1 provided at the front of the fuselage F and adapted to be closed by a door 2 (FIG. 3).

This device comprises carrier and guide means formed, on one hand, by two rails 3 fixed on the upper wall of the fuselage inside the latter and in a position perpendicular to the axis X—X, so that the end of each rail 3 facing the opening 1 is located in the vicinity of a corresponding upper corner of this opening, the rails 3 being contained in a plane parallel to the axis of the fuselage F.

The carrier and guide means further comprise two arms 4 each articulated in the region of one of their ends inside the fuselage in the vicinity of a corresponding corner of the opening 1 about a common axis parallel to the axis X—X. These arms 4 are each provided on their lower side with a respective rail 5 similar to the rails 3 fixed inside the fuselage, and they are so articulated and positioned that they are pivotable between an extended position in which they extend parallel to each other and project outside the fuselage so that each rail 5 extends a corresponding neighbouring rail 3 outside the fuselage, and a retracted position in which they are withdrawn into the fuselage of the aircraft in the direction of the height of the opening 1.

To permit this total withdrawal into the fuselage and benefit from a great length in the extended position, the arms 4 are each divided in their length into two parts 4a, 4b articulated together to pivot about an axis parallel to the articulation axis of the arm on the fuselage so that the upper sides of the arm parts assume a position in facing relation to each other in the retracted position of these arm parts. Each rail 5 is thus also constructed in two parts each of which extends along a part 4a or 4b of the corresponding arm. The spacing between the arms 4 is maintained by means of two braces 6 one of which extends between the two arm parts 4a in the vicinity of the fuselage while the other brace extends between the free end arm parts 4b (FIG. 2).

The arms 4 are associated with support means for supporting them in the extended position, these support means comprising two stays 7 each of which is articulated at one of its ends about an axis parallel to the axis X—X on a respective arm 4, and at its other end also about an axis parallel to the axis X—X on a corresponding trolley 8 slidably mounted in a respective rail 9 fixed to a floor P provided in the fuselage and extending in a direction perpendicular to the axis X—X.

The hoisting means of the loading device of the invention comprise four tackles 10 each carried by a respective trolley 11. The trolleys 11 are associated in pairs, each pair of trolleys 11 being slidably mounted in a corresponding rail 3 and in the rail 5 extending the latter in the extended position of the respective arm 4. The trolleys 11 of a given pair are interconnected to move in translation together by connecting means 12 which may be provided with adjusting means (not shown) of the two trolleys interconnected in this way. The spacings of the trolleys 11 in the two pairs are equal and are such that, when the two trolleys 11 are at the end of the rails 5 under the arms 4, the tackles 10 carried by the other two trolleys 11 are contained in a vertical plane outside the fuselage F and they may possibly be so adjusted that, when the last-mentioned trolleys are in their end-of-travel position of abutment at the corresponding ends of the rails 3 in the fuselage, the other two trolleys are completely withdrawn into the fuselage in extending in the rails 3.

In the illustrated embodiment, the arms 4 have such length that the tackles 10 carried by a given pair of trolleys 11 have a maximum distance apart of 2.80 m, the spacing between the arms being limited by the width of the opening 1 and being 6 m.

The tackles 10 are of the known type and each include a pulley 13 connected to the corresponding trolley 11 and a pulley 14 connected to the pulley 13 through a respective hoisting control cable 15 one end of which is fixed to the associated trolley 11.

The pulleys 14 of the homologous tackles 10 of the two pairs of trolleys 11 are connected in pairs by a beam 16, whereby it is possible to fix the loads by means of ropes 17. To permit the fastening of loads of different dimensions, these beams each include a series of apertures spaced along their length for the fastening of the ropes 17.

Figure 4:
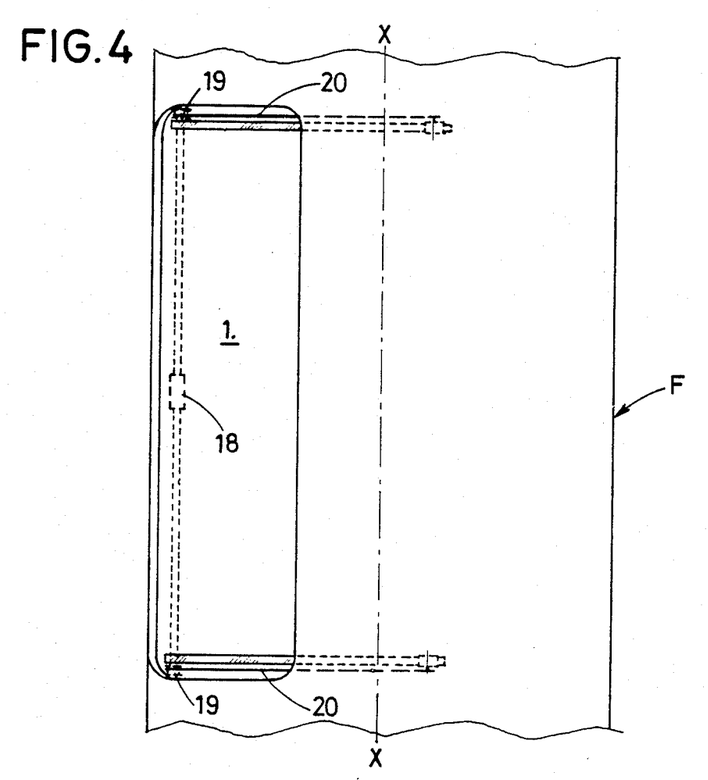
FIG. 4 is a diagrammatic top plan view of FIG. 3.

A motor 18 incorporated in the floor P between the two arms 4 adapted to drive the two winding elements 19 each connected through a corresponding cable 20 to a trolley 8, enables the arm parts 4a of the arms 4 to be automatically extended and retracted. In FIG. 4, the winding elements are disposed in the floor in the vicinity of the ends of the rails 9 adjacent to the lateral opening 1.

During the loading and unloading operations, a protecting and guiding element 21 is disposed along the lower edge of the opening 1 and thus forms a threshold (FIG. 1). As shown in FIG. 3, stops 22 of elastic material are fixed to the inner wall 2 for maintaining in the retracted position of the loading device and in the retracted position of the door 2, the arms 4 in position by the bearing of these arms against the arm parts 4b.

According to an advantageous arrangement of a device of the invention, at least one of the rails 3, namely the rear rail relative to the aircraft if the lateral door is located at the front of the latter, is withdrawable in the direction toward the axis X—X so as to benefit from a maximum height inside the fuselage.

Figure 5:
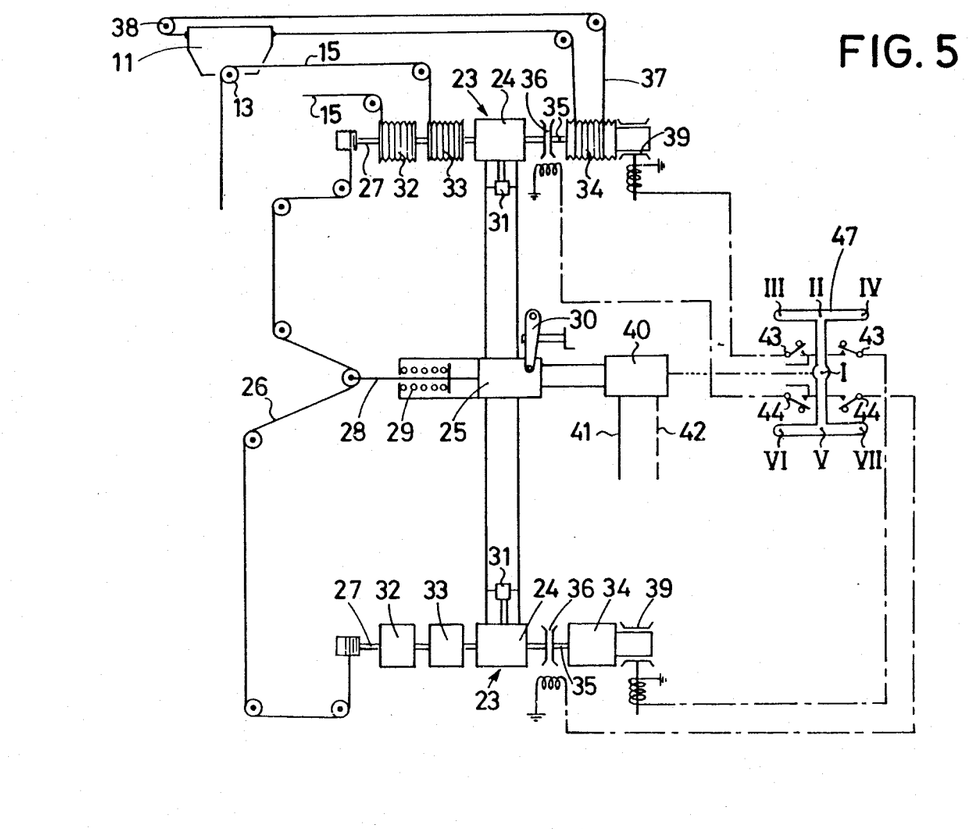
FIG. 5 is a diagram partly illustrating the actuating means of the hoisting means, the shifting means of the latter, and the associated control means.
Figure 6:
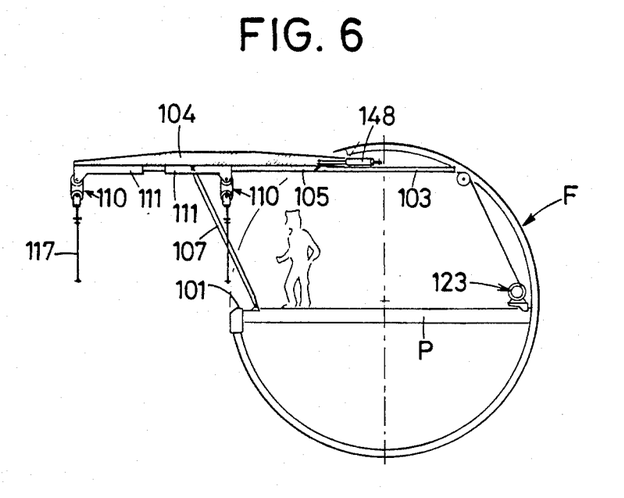
FIG. 6 is a view similar to FIG. 1 of a second embodiment of the loading device according to the invention.
Figure 7:
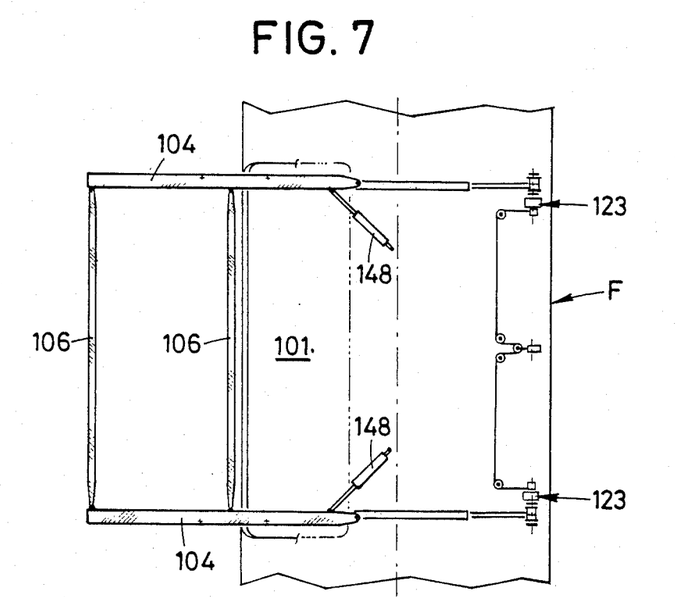
FIG. 7 is a diagrammatic top plan view of FIG. 6.
Figure 8:
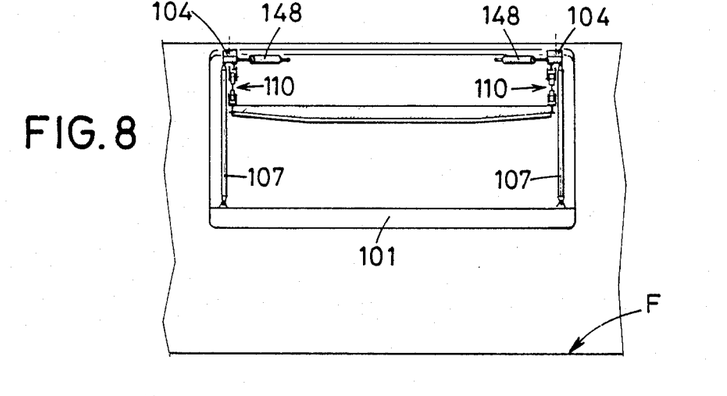
FIG. 8 is a diagrammatic side elevational view of the fuselage of the cargo-aircraft of FIG. 6 illustrating the onboard loading device in the extended position.
Figure 9:
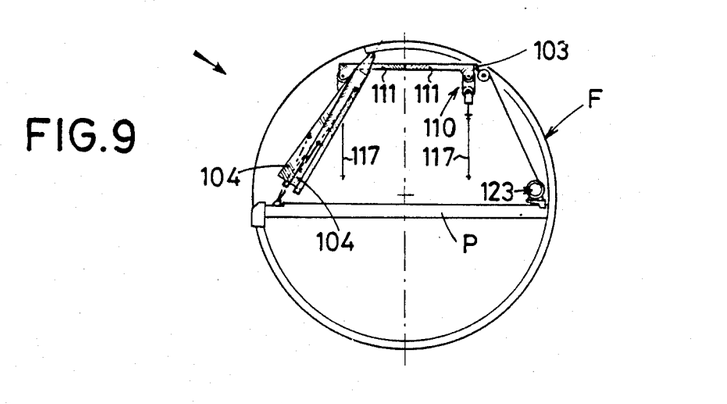
FIG. 9 is a view similar to FIG. 6 after the device of the invention has been retracted.
Figure 10:
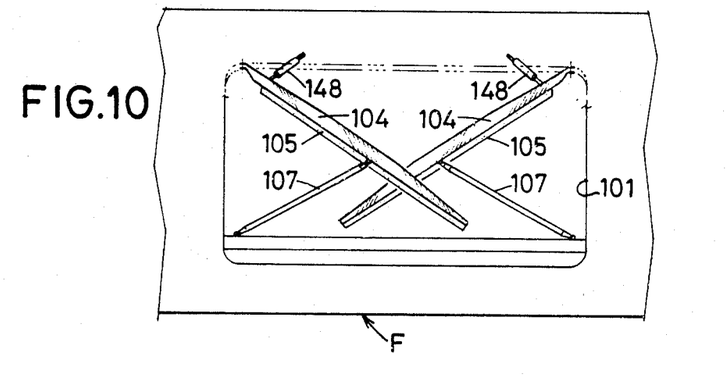
FIG. 10 is a diagrammatic view seen from the side of FIG. 9 facing the lateral opening of the fuselage with the loading device in the retracted position.

The actuating means of the hoisting means and the means for shifting the latter along the guide means formed by the rails 3 and 5, shown in FIG. 5, comprise two winches 23 each driven by a corresponding hydraulic motor 24.

Each winch 23 is associated with a pair of trolleys 11 and tackles 10 sliding in the same rails or shifting the trolleys in the rails and actuate the tackles in the manner described hereinafter.

The hydraulic motors 24 are connected by known synchronization means comprising an element 25 distributing a hydraulic fluid between the two motors and a device for regulating this distributing element 25 of the type having a cable 26 connecting the shafts 27 of the winches 23 and a regulating piston 28 whose movement in the distributing element is controlled by variations in the tension of the cable 26 in opposition to the force exerted by a coil spring 29.

Also provided is a known balancing element 30 ("trim") which acts on the distributing element 25 for acting on the difference between the speeds of the motors 24 and thus modify the inclination of a load carried by the arms 4 with respect to the axis of the fuselage and bring the load to a position parallel to the floor P or to the ground on which the cargo-aircraft rests.

Each winch 23 includes a brake device 31 acting by a throttling of a fluid adapted to reduce the speed of the corresponding motor 24 at the end of the travel, and three drums of which two drums 32 and 33 are disposed on the main shaft 27 of the winch and a third drum 34 is disposed on a secondary shaft 35 adapted to be coupled to the neighbouring shaft 27 by means of an electrically controlled clutch 36.

The two drums 32 and 33 each cooperate with a respective cable 15 for controlling a tackle 10 pertaining to a given pair of tackles for hoisting and lowering this tackle, and the drum 34 cooperates with a respective cable 37 one portion of which pulls the associated trolleys 11 toward the fuselage while the other portion, which passes around a return pulley 38 at the end of the corresponding arm 4, pulls them toward the free end of this arm. Each drum 34 is also provided with an electrically controlled brake 39 adapted to lock the corresponding drum 34 when the respective clutch 36 is in the released position. As a modification, when the distance between the tackles of a given pair is not variable, the drums 32 and 33 may be replaced by a single drum.

The control means of the winches 23 comprise an element 40 for injecting and discharging hydraulic fluid controlling the motors 24 connected to a supply duct 41 and to a discharge duct 42. The means controlling the clutches 36 and the brakes 39 comprise, for each thereof, a corresponding switch 43 for the brakes and 44 for the clutches. The element 40 and the switches 43 and 44 are connected to a selection device diagrammatically represented at 47 in FIG. 5 and having seven positions in an H configuration.

The selection device 47 thus has a main central position I in which the motors 24 are inoperative, the brakes 39 lock the drums 34 and the clutches 36 in the engaged position. On each side of this position I three positions are provided, on one hand, the positions II, III and IV in which the clutches 36 are engaged, and the brakes 39 are released, and, on the other hand, the positions V, VI and VII in which the clutches 36 are released and the brakes 39 applied.

The positions II and V constitute secondary central positions in which the motors 24 are inoperative.

The positions III, IV, VI and VII correspond to the positions for actuating the winches 23 for the motors 24. In the position III, the trolleys 11 are shifted toward the exterior of the fuselage. In the position IV, the trolleys 11 are shifted toward the interior of the fuselage. In the position VI, the pulleys 14 of the tackles 10 are lowered and in the position VII they are raised.

To operate the loading device of the invention in starting in its retracted position, the lateral door 2 of the aircraft is opened, the arm parts 4b are extended and the motor 18 is actuated in order to cause the trolleys 8 to slide in the rails 9 in such a manner as to raise the stays and open out the arms 4 to a position outside the fuselage, the rails 5 then extending in the extension of the rails 3. At this stage, to unload a load from the aircraft, the load is fastened to the ropes 17, the selection device 47 is put into position VII for raising the load off the floor P, the selection device is shifted to position V in which the load is maintained in a vertical position by the brakes 31 acting on the motors 24, then in a position III for passing the load out of the fuselage. The selection device 47 is then put into position VI in which the drums 34 are isolated and braked and in which the winches 23 lower the load to a suitable level. To load a load, the latter is fastened to the ropes 17, the selection device 47 is put into position VII for hoisting the load to the height of the opening 1, the selection device 47 is placed into position IV for bringing the load into the fuselage, and then the device 47 is brought to position VI for depositing the load on the floor P. In the case of a load having great height, when the latter is deposited on the floor P, it is unhooked from the beam 16, the beam 16 remote from the opening 1 is removed, the device 47 is placed into position VII for raising the tackles, then into position III for placing them outside the fuselage and the rear rail 3 is withdrawn in order to benefit from a maximum height inside the fuselage.

To withdraw the loading device into the fuselage, the tackles 10 are brought in and the beams are immobilized either by connecting them to the floor P or leaving a load fastened to the beams by keeping the ropes 17 taut. The arms 4 are retracted in a manner opposite to that previously described.

This device is advantageous in that it is light weight and effective since it is capable of hoisting as much as 15 times its own weight. It does not limit the dimension of the opening of the aircraft in height and only very slightly limits the width of the opening. In the retracted position, it has only a small overall size which does not affect the available volume for the loads. It also permits dispensing with a platform having balls for handling the loads at the entrance of the fuselage. This device which is particularly adapted for large transport aircraft having low wings, in particular military aircraft, affords the advantages of aircraft having a ramp and a rear door, apart from the limitation as concerns the length of the loads.

As a modification, a single winch 23 may be provided instead of the aforementioned two winches and, for aircraft transporting only relatively light loads, a manual cranked winch may be provided. Electric winches and electric balancing and synchronization devices may also be employed.

In the second embodiment of the loading device of the invention shown in FIGS. 6 to 10, the same reference letters and the same reference numerals increased by 100 are used for parts which are identical or similar to those of the foregoing embodiment. The description will therefore be limited merely to the modifications in this embodiment relative to that just described.

The arms 104 are made in a single part in that they are adapted to assume a diagonal retracted position in the fuselage in confronting relation to the opening 101 where they cross each other. Thus, instead of being articulated as before to pivot about an axis parallel to the axis of the fuselage, they are articulated to pivot about axes which are inclined relative to the axis of the fuselage. The stays 107 are each articulated, on one hand, directly to the floor at one end, and on the other hand, to a respective arm 104 at the opposite end.

The extending and retracting means provided for this embodiment comprise two jacks 148 each disposed in the vicinity of an upper corner of the opening 101 inside the fuselage, these jacks being articulated at one end to a corresponding arm 104 and at the other end to the upper wall of the fuselage so as to extend the arm outside the fuselage by extension of the jack and to withdraw it inside the fuselage by retraction of the jack.

Figure 11:
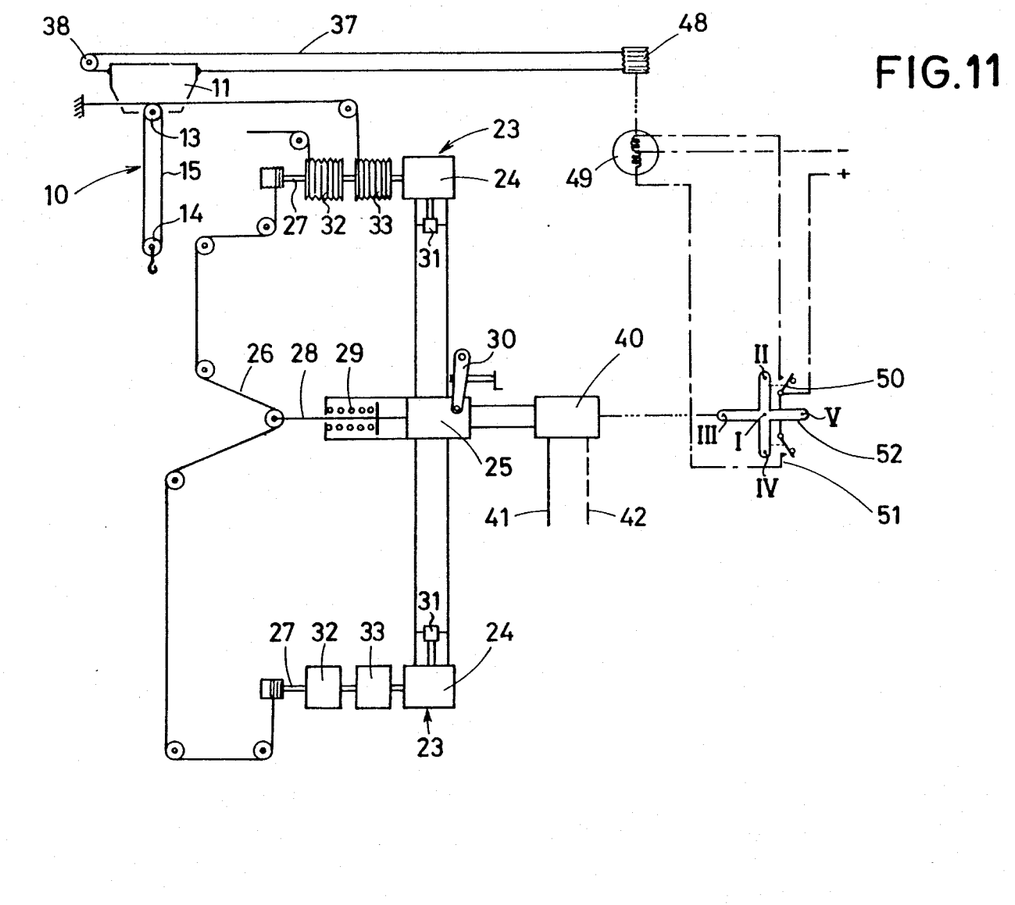
FIG. 11 is a diagram illustrating a variant of the hoisting means, the shifting means for the latter and the associated control means.

FIG. 11 illustrates a variant of the construction of the means for shifting the hoisting means and the means for controlling the loading device which were described with reference to FIG. 5, the similar or identical component parts retaining the same reference numerals. The description of this variant will be limited to the adopted modifications.

The clutches 36, the brakes 39 and the drums 34 have been replaced by a winch having an electric motor 49 and connected to two drums 48 (only one drum being shown in FIG. 11). As before, each drum cooperates with a respective cable 37 for shifting the trolleys 11 in both directions along the guide means. The means for controlling the electric motor 49 comprise a switch 50 controlling its rotation in one direction and a switch 51 controlling its rotation in the opposite direction.

The control element 40 of the hydraulic motors 24 and the switches 50 and 51 are connected to a selection device diagrammatically represented at 52 and having five positions forming a cross configuration. This device 52 therefore has a central position I in which the motors 24 and the motor 10 are inoperative and four end positions II, III, IV, V.

In the positions II and IV, the motors 24 are inoperative and the motor 10 actuated. In the positions III and V, the motor 10 is inoperative and the motors 24 actuated.

The position II corresponds to the position in which the switch 50 is closed, the switch 51 being open, and the trolleys 11 are shifted in one direction along the guide means, the position IV corresponding to the opposite movement.

The position III corresponds to the position in which the motors 24 act on the cables 15 for raising the pulleys 14 of the tackles 10, the position V corresponding to the opposite movement.

FIG. 11 illustrates a variant as concerns the fastening of the end of the cables 15 remote from the winches 23, which is in this case fastened to the end of the corresponding arm 4.

I claim:

1. Autonomous onboard loading device for a cargo-aircraft which has a fuselage having a longitudinal axis, a floor in the fuselage, a lateral opening and a lateral door for the opening, said device comprising hoisting means movable between the exterior and interior of the fuselage of the aircraft, carrier and guide means for the hoisting means, for the movement of the hoisting means between the interior and exterior of the fuselage, comprising a first part extending transversely inside the fuselage in the region of the lateral door and fixed in an upper part of the fuselage, and a second part movable between an extended position in which it is in the extension of the first part outside the fuselage and projects transversely beyond the fuselage through an upper part of said opening uncovered by the lateral door and a retracted position in which the second part is withdrawn into the fuselage, support means for the second part of the carrier and guide means in the extended position of the second part, actuating means for the hoisting means, means for shifting the hoisting means along the carrier and guide means, and means for extending and retracting the second part of the carrier and guide means, the second part of the carrier and guide means comprising two arms each articulated at an end of the arm inside the fuselage in the vicinity of a corresponding upper corner of said lateral opening of the fuselage, said arms extending in a direction substantially parallel to each other in said extended position.

2. Device according to claim 1, wherein the support means comprise two stays each extending between a respective arm and the floor in the fuselage, the stays being articulated at each end of the stays to permit the retraction and extension of the arms.

3. Device according to claim 1, wherein the arms are articulated to pivot about an axis parallel to the axis of the fuselage.

4. Device according to claim 3, wherein each said arm comprises two longitudinal arm parts articulated together so as to assume a position in which they are in the extension of each other in said extended position of the arm.

5. Device according to claim 4, wherein said arm parts are articulated to pivot about an axis parallel to the axis of the fuselage.

6. Device according to claim 2, wherein the arms are articulated to pivot about an axis parallel to the axis of the fuselage and each stay has a lower end, to which lower end is articulated a respective trolley, which trolley is slidably mounted in an associated rail fixed transversely in the floor of the fuselage.

7. Device according to claim 6, wherein the extending and retracting means of the second part of the carrier and guide means comprise means for driving in translation the trolleys in the associated rails.

8. Device according to claim 7, wherein the means for driving in translation the trolleys comprise a motor disposed in the floor between the two rails, two winding elements drivenly connected to the motor and a cable connecting the winding elements to the corresponding trolley.

9. Device according to claim 1, wherein the arms are each articulated to pivot about an axis which is inclined relative to the axis of the fuselage.

10. Device according to claim 9, wherein the fuselage has an upper wall and the extending and retracting means of the second part of the carrier and guide means comprise two jacks each disposed in the fuselage between the upper wall of the fuselage and the respective arm.

11. Device according to claim 1, including at least one brace between the arms.

12. Device according to claim 1, wherein the fuselage has an upper wall, the first part of the carrier and guide means comprises two first rails fixed in parallel relation to each other on the upper wall of the fuselage, the second part of the carrier and guide means comprises two second rails each fixed under the corresponding arm, and the position of the arms relative to the first rails is such that in the extended position of the first rails, the second rails assume a position in the extension of the first rails.

13. Device according to claim 12, wherein at least one of the first rails is withdrawable in a direction toward the axis of the fuselage.

14. Device according to claim 1, wherein the carrier and guide means comprise rails, the hoisting means comprise on each arm two tackles and a respective trolley carrying each tackle and slidably mounted in the rails of the carrier and guide means.

15. Device according to claim 14, wherein the trolleys carried by a respective arm are so interconnected as to move together.

16. Device according to claim 15, wherein the actuating means of the hoisting means comprise for each arm a corresponding winch including at least one drum and a respective cable connecting each of the tackles of the arm to the drum.

17. Device according to claim 16, comprising means for synchronizing the two winches of the actuating means.

18. Device according to claim 17, including balancing means associated with and to act on the synchronizing means for modifying the inclination of a load carried by the hoisting means relative to the axis of the fuselage.

19. Device according to claim 15, wherein the means for shifting the hoisting means comprise for each arm a corresponding winch including a drum and a cable connecting the drum to the trolleys of the arm.

20. Device according to claim 19, wherein the actuating means of the hoisting means comprise for each arm a corresponding winch including at least one drum and a respective cable connecting each of the tackles of the arm to the drum, the shifting means associated with a respective arm being controlled by the corresponding winch of the actuating means, and releasable coupling means being provided for isolating the drum of the shifting means.

21. Device according to claim 20, wherein each drum of the shifting means is associated with braking means.

22. Device according to claim 16, wherein a respective hydraulic motor is drivenly connected to each of the winches of the actuating means.

* * * * *